United States Patent Office 3,465,015
Patented Sept. 2, 1969

3,465,015
NOVEL MERCAPTOARYL SILICON COMPOUNDS
John L. Speier, Midland, Mich., assignor to Dow Corning Corporation, Midland, Mich., a corporation of Michigan
No Drawing. Filed Dec. 16, 1966, Ser. No. 602,190
Int. Cl. C07f 7/02; C07d 1/00; C03c 17/30
U.S. Cl. 260—448.2                              8 Claims

ABSTRACT OF THE DISCLOSURE

The compositions are of the class of mercaptoaryl silicon compounds possessing both a silicon bonded functional group and a thiol radical, useful as coupling agents that impart heat stability at severe temperatures. Illustrative of a member of the class is the compound

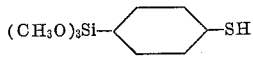

The mercaptoaryl silicon compounds are prepared by contacting in the presence of an organic solvent, a compound of the general formula $R_3$—Si—S—R'—Z with a compound of the general formula $X'_y$—Si—$R_{4-y}$, with a metal and thereafter contacting the mixture in the presence of an alcohol to recover the mercaptoaryl silicon compound. Illustrative of the preparation is the following:

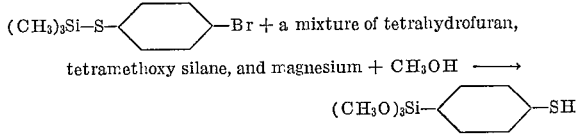

---

This invention relates to novel mercaptoaryl silicon compounds and more particularly to those which are useful as coupling agents that impart heat stability at extremely high temperatures.

The mercaptoaryl silicon compounds of the present invention possess both a silicon bonded functional group and a thiol radical and thus, have been found to be excellent coupling agents for epoxy resins, polyamide resins, and the like. It has been also determined that the novel compounds of this invention provide coupling agents which perform especially well at elevated temperatures. For example, one can effectively apply the mercaptoaryl silicon compound to the surface of glass cloth or a similar fiber which is ultimately employed as a laminate. The fact that the novel compound imparts excellent coupling characteristics and performs well at high temperatures results in a laminate having substantially greater strength at both normal and elevated temperatures.

In accordance with the above, it is an object of the present invention to provide novel mercaptoaryl silicon compounds which are excellent coupling agents and are particularly siutable for high temperature use.

These and other objects will become readily apparent from a consideration of the following detailed description of the present invention.

This invention relates to novel mercaptoaryl silicon compounds selected from the group consisting of (1) silanes of the general formula $$(HSR')_{4-m-n}Si—X_nR_m$$

(2) siloxanes of the average unit formula

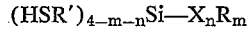

(3) copolymers of units of (2), and

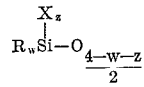

in which
R is a monovalent hydrocarbon radical, free of aliphatic unsaturation,
R' is an arylene or aralkylene radical,
X is a member selected from the group consisting of a halogen atom, an alkoxy radical, an acyloxy radical, an OH group, or an aryloxy radical,
$a$ has a value of from 1 to 3 inclusive,
$b$ has a value of from 0 to 2 inclusive,
$c$ has a value of from 0 to 2 inclusive,
$m$ has a value of from 0 to 2 inclusive,
$n$ has a value of from 1 to 3 inclusive,
$w$ has a value of from 0 to 3 inclusive,
$z$ has a value of from 0 to 3 inclusive, and the sum of $a+b+c$ cannot exceed 3, and the sum of $m+n$ cannot exceed 3.

In the above formulae, R can be a monovalent hydrocarbon radical free of aliphatic unsaturation such as the methyl, ethyl, propyl, isopropyl, butyl, isobutyl, t-butyl, amyl, octyl, decyl, dodecyl, octadecyl, myricyl, cyclopentyl, cyclohexyl, phenyl, xenyl, naphthyl, tolyl, xylyl, mesityl, ethylphenyl, benzyl, phenylethyl, and the beta-phenylpropyl radical among numerous others. However, practical considerations dictate that the preferred R radicals are those which contain from 1 to 6 carbon atoms, particularly the alkyl radicals.

R' as defined above can be an arylene or aralkylene radical such as the phenylene, tolylene, xylylene, mesitylene, xenylene, ethylphenylene, propylphenylene, and t-butylphenylene radical, etc.

Illustrative of the X radicals which are envisioned within the scope of the present invention include hydroxyl groups; alkoxy radicals such as the methoxy, ethoxy, propoxy, isopropoxy, butoxy, and isobutoxy radical among others; halogen atoms such as the chlorine, bromine, fluorine, and iodine atom; acyloxy radicals such as the acetoxy, propionoxy, butoxy, and decanooxy radical as well as many others; and aryloxy radicals such as the phenoxy, anthryloxy, naphthyloxy radical, etc.

As related above, in the silanes (1), $m$ has a value of from 0 to 2 inclusive and $n$ has a value of from 1 to 3 inclusive. For purposes of this invention it is generally preferable that $n$ has a value of 3.

It is of importance to note that the siloxanes (2) are particularly suitable for modifying existing organic compounds containing residual aliphatic unsaturation to achieve the desired advantages described above.

This invention also relates to a method for preparing the novel mercaptoaryl silicon compounds defined herein which comprises, (A) Contacting in the presence of an organic solvent, a compound of the general formula (1)         $R_3$—Si—S—R'—Z in which
R is a monovalent hydrocarbon radical free of aliphatic unsaturation,
R' is an arylene or aralkylene radical, and
Z is a halogen atom, with a compound of the general formula (2) 

in which
R is as above defined,

X' is a member selected from the group consisting of a halogen atom, an alkoxy radical, an acyloxy radical, or an aryloxy radical, at least one X' is radical being a halogen atom, with (3) a metal which is a member selected from the group consisting of magnesium, aluminum, copper, zinc, lithium, or calcium, and (B) Thereafter contacting the mixture of (A) in the presence of an alcohol to recover the novel mercaptoaryl silicon compound.

In the above formulae, illustrative examples of the R, R', and X' radicals are those which have been heretofore related. The Z radicals which are operative herein can be a halogen atom such as the chlorine, bromine, fluorine, or iodine atom. The metal (3) can be any metal as herein indicated, however, for practical considerations and the like, magnesium is normally preferred.

It is to be noted that the novel compounds of this invention can also be prepared by alternatively employing cadmium and mercury as the metal. When the latter method is used, the reaction product of (1), (2), and (3) is subsequently contacted with a mercury halide or a cadmium halide after which the mixture is then contacted with the alcohol to recover the mercaptoaryl silicon compound.

The organic solvent employed in (A) is one which shall not preferentially react with the starting materials. Hence, organic solvents which are perfectly suitable in the present invention include tetrahydrofuran, methyl ether, ethyl ether, and dioxane, as well as mixtures of ethers and hydrocarbon solvents such as benzene and toluene, etc.

The alcohol used in (B) can be any well-known alcohol, e.g., methanol, ethanol, propanol, and isopropanol among countless others. However, in view of expediency and for other like reasons, it has been found that methanol is to be most preferred.

The siloxanes and silanols of the present invention can be prepared by hydrolyzing and/or condensing the novel silanes disclosed herein. Said hydrolysis and condensation reaction is well known in the art and is revealed in a multitude of United States patents.

The following examples are illustrative only and should not be construed as limiting the invention which is properly delineated in the appended claims.

Example 1

40.0 ml. of

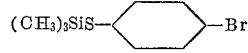

was added to a mixture of 100 ml. of tetrahydrofuran, 75.0 ml. of tetramethoxysilane, and 5.3 grams of magnesium. The magnesium was activated with several drops of 1,2-dibromoethane. An exothermic reaction kept the temperature at 75–80° C. throughout the addition.

After cooling to room temperature, 21.6 grams of $(CH_3)_3SiCl$ was added to neutralize the mixture. The mixture was then cooled to 10° C. and filtered. The filtrate was distilled free of solvent and the residue was again filtered and 50.0 ml. of methanol was added to the filtrate. The solution was strip distilled to give 36.0 grams of crude product. Fractionation provided 12.0 grams (33.0 percent yield) of

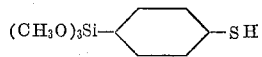

The mercaptoaryl compound has a boiling point of 140° to 150° C. at 15 mm. of pressure. It has a specific gravity of 1.5220 and G. L. C. indicated that the material was 95.0 percent pure.

The product was hydrolyzed by mixing 9.7 grams of the product with 8.0 ml. of 0.05 N hydrochloric acid for 20 minutes. An insoluble white material was formed. The mixture was diluted with 25 ml. of methylene chloride, washed with water and filtered again to obtain the corresponding siloxane of the units

Example 2

When the following materials are substituted for the corresponding materials of Example 1, the indicated mercaptoaryl silicon compounds are obtained.

| $R_3Si-S-R'-Z$ | $X'_ySiR_{4-y}$ | Product |
|---|---|---|
| (A) $(CH_3CH_2)_3Si-S-\langle\rangle-Cl$ | $CH_3OSi-Cl$ with $(CH_3)_2$ | $CH_3OSi-\langle\rangle-SH$ with $(CH_3)_2$ |
| (B) $(\langle\rangle)_3-Si-S-\langle\rangle-Br$ | $(CH_3\overset{O}{C}-O)_3-Si-Br$ | $(CH_3\overset{O}{C}O)_3-Si-\langle\rangle-SH$ |
| (C) $(CH_3-\overset{CH_3}{CH}CH_2)_2-\overset{CH_3}{Si}-S-\langle\rangle-CH_2Cl$ | $(\langle\rangle-O)_2-Si-Cl$ with $\langle\rangle$ | $(\langle\rangle-O)_2-Si-CH_2-\langle\rangle-SH$ with $\langle\rangle$ |
| (D) $\langle\langle\rangle\rangle-\overset{CH_3CH_2}{\underset{CH_3}{Si}}-S-\langle\rangle-Cl$ | $(CH_3)_2Si-O-(SiO)_9-SiCl$ with $(CH_3)_2$ and $(CH_3)_2$ | $(CH_3)_3SiO-(SiO)_9-Si-\langle\rangle-SH$ with $(CH_3)_2$ and $(CH_3)_2$ |
| (E) $(CH_3)_3Si-S-\langle\rangle-\overset{CH_3}{C}HCH_2Cl$ | $(CH_3CH_2O)_3-Si-Cl$ | $(CH_3CH_2O)_3Si-CH_2-\overset{CH_3}{C}H-\langle\rangle-SH$ |
| (F) $2(CH_3)_3Si-S-\langle\rangle-Cl$ | $Cl_2Si(OCH_3)_2$ | $(CH_3O)_2Si-(\langle\rangle-SH)_2$ |
| (G) $3(CH_3)_3Si-S-\langle\rangle-Cl$ | $Cl_3SiOCH_3$ | $CH_3OSi-(\langle\rangle-SH)_3$ |

3,465,015

| $R_3Si-S-R'-Z$ | $X'_ySiR_{4-y}$ | Product |
|---|---|---|
| (H) $(CH_3)_3Si-S-\langle\bigcirc\rangle-Br$ | $CH_3OSi-Br$<br>$\|$<br>$(C_6H_{11})_2$ | $CH_3OSi-\langle\bigcirc\rangle-SH$<br>$\|$<br>$(C_6H_{11})_2$ |
| (I) $(\langle\bigcirc\rangle)_2-Si-S-\langle\bigcirc\rangle-Cl$ | $(CH_3O)_2Si-Cl$<br>$\|$<br>$C_{20}H_{41}$ | $(CH_3O)_2Si-\langle\bigcirc\rangle-SH$<br>$\|$<br>$C_{20}H_{41}$ |
| (J) $(CH_3)_3Si-S-\langle\bigcirc\rangle-Cl$ | $CH_3OSi-Cl$<br>$\|$<br>$(\langle\bigcirc\rangle-\langle\bigcirc\rangle)_2$ | $CH_3OSi-\langle\bigcirc\rangle-SH$<br>$\|$<br>$(\langle\bigcirc\rangle-\langle\bigcirc\rangle)_2$ |
| (K) $(CH_3)_3Si-S-\langle\bigcirc\rangle-I$ | $(CH_3O)_2Si-I$<br>$\|$<br>naphthyl | $(CH_3O)_2Si-\langle\bigcirc\rangle-SH$<br>$\|$<br>naphthyl |
| (L) $(CH_3)_3Si-S-\langle\bigcirc\rangle-Br$ | $CH_3O[(CH_3)_2SiO]_{21}Si-Cl$<br>$\|$<br>$(CH_2CH_2-\langle\bigcirc\rangle)_2$ | $CH_3O[(CH_3)_2SiO]_{21}Si-\langle\bigcirc\rangle-SH$<br>$\|$<br>$(CH_2CH_2-\langle\bigcirc\rangle)_2$ |

Example 3

When the product of Example 2(A) is hydrolyzed with dilute hydrochloric acid, the resultant compound is

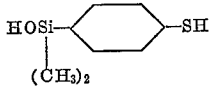

$HOSi-\langle\bigcirc\rangle-SH$
$\|$
$(CH_3)_2$

Example 4

When aluminum, copper, zinc, lithium, and calcium are substituted for the magnesium in Example 1, equivalent results are obtained.

Example 5

When the mixture of Example 1 is contacted with either a mercury halide or a cadmium halide prior to the addition of methanol, equivalent results are obtained.

That which is claimed is:

1. A mercaptoaryl silicon compound of the formula $$(HSR^1)_{4-m-n} Si-X_nR_m$$

in which
R is a monovalent hydrocarbon radical free of aliphatic unsaturation,
$R^1$ is an aryl or aralkyl radical,
X is a member selected from the group consisting of a halogen atom, an alkoxy radical an acyloxy radical, an OH group, and an aryloxy radical,
m has a value of from 0 to 2 inclusive,
n has a value of from 1 to 3 inclusive, and the sum of m+n cannot exceed 3.

2. The mercaptoaryl silicon compound as recited in claim 2 wherein m is 0, n is 3, X is an alkoxy radical, and R' is an aryl radical.

3. The mercaptoaryl silicon compound as recited in claim 2 wherein the formula is

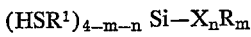

$(CH_3O)_3Si-\langle\bigcirc\rangle-SH$

4. A method for preparing mercaptoaryl silicon compounds which comprises
(A) contacting the presence of an organic solvent a compound of the formula (1) $R_3Si-S-R'-Z$ in which R is a monovalent hydrocarbon radical free of aliphatic unsaturation,
R' is an aryl or aralkyl radical, and Z is a halogen atom, with a compound of the formula (2) $X_y'Si$
$\|$
$R_{4-y}$ in which
R is as above defined, and
X' is a member selected from the group consisting of a halogen atom, an alkoxy radical, an acyloxy radical, or an aryloxy radical, at least one X radical being a halogen atom, with (3) a metal which is a member selected from the group consisting of magnesium, aluminum, copper, zinc, lithium, or calcium, and
y has a value of from 1 to 4 inclusive.
(B) thereafter contacting the mixture of (A) in the presence of an alcohol to recover the novel mercaptoaryl compound.

5. The process as recited in claim 4 wherein the metal (3) is magnesium.

6. The process as recited in claim 5 wherein the alcohol in (B) is methanol.

7. The process as recited in claim 6 wherein the organic solvent in (A) is tetrahydrofuran.

8. The process as recited in claim 7 wherein n is 3, R is a methyl radical, R' is a phenyl radical, Z is a bromine atom, one X is a chlorine atom, and the remaining X's are methoxy radicals.

References Cited

UNITED STATES PATENTS 3,382,196  5/1968  Gowdy et al. ____ 260—448.2 X
3,388,144  6/1968  Musolf et al. _____ 260—448.8

TOBIAS E. LEVOW, Primary Examiner
P. F. SHAVER, Assistant Examiner

U.S. Cl. X.R.
117—124; 260—78, 348, 448.8